(12) United States Patent
Harif

(10) Patent No.: US 6,820,056 B1
(45) Date of Patent: Nov. 16, 2004

(54) RECOGNIZING NON-VERBAL SOUND COMMANDS IN AN INTERACTIVE COMPUTER CONTROLLED SPEECH WORD RECOGNITION DISPLAY SYSTEM

(75) Inventor: Shlomi Harif, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 09/717,819

(22) Filed: Nov. 21, 2000

(51) Int. Cl.$^7$ .............................................. G10L 15/24
(52) U.S. Cl. ................................... 704/275; 704/270
(58) Field of Search ............................ 704/251, 235, 704/270, 275

(56) References Cited

U.S. PATENT DOCUMENTS

| | | | |
|---|---|---|---|
| 4,776,016 A | 10/1988 | Hansen | 381/42 |
| 5,209,695 A * | 5/1993 | Rothschild | 446/175 |
| 5,231,670 A | 7/1993 | Goldhor et al. | 381/43 |
| 5,799,279 A | 8/1998 | Gould et al. | 704/275 |
| 5,818,423 A | 10/1998 | Pugliese et al. | 345/157 |
| 5,864,815 A * | 1/1999 | Rozak et al. | 704/275 |
| 5,875,429 A | 2/1999 | Douglas | 704/275 |
| 5,890,123 A | 3/1999 | Brown et al. | 704/275 |
| 5,903,870 A | 5/1999 | Kaufman | 704/275 |
| 5,920,841 A | 7/1999 | Schottmuller et al. | 704/275 |
| 6,075,534 A | 6/2000 | VanBuskirk et al. | 345/348 |
| 6,085,159 A | 7/2000 | Ortega et al. | 704/235 |
| 6,519,566 B1 * | 2/2003 | Boyer et al. | 704/275 |
| 2002/0059071 A1 * | 5/2002 | Lewis et al. | 704/270 |

* cited by examiner

Primary Examiner—Richemond Dorvil
Assistant Examiner—Abul K. Azad
(74) Attorney, Agent, or Firm—Jerry B. Kraft; Jeffery S. LaBaw

(57) ABSTRACT

Simplifying command recognition from speech term recognition in speech recognition technology. A system for recognizing non-verbal sound commands within an interactive computer controlled display system with speech word recognition comprises standard technology for recognizing speech words in combination with a set up for storing a plurality of non-verbal sounds, each sound representative of a command. There are display means responsive to the recognizing of speech words for then displaying the recognized words. In response to the input of non-verbal sounds, there is a comparison of the input non-verbal sounds to said stored command sounds, together with means responsive to the comparing means for carrying out the command represented by a stored sound which compares to an input non-verbal sound. The non-verbal sounds may be voice generated or they may be otherwise physically generated. The commands may direct movement of data, e.g. cursors displayed on said display system. In such a case, an implementation is provided for inputting a sequential list of the sounds representative of said command directing movement to thereby produce a sequential movement of the displayed data, e.g. cursor movement.

12 Claims, 7 Drawing Sheets

RECOGNIZING NON-VERBAL SOUND COMMANDS IN AN INTERACTIVE COMPUTER CONTROLLED SPEECH WORD RECOGNITION DISPLAY SYSTEM

CROSS-REFERENCE TO RELATED COPENDING PATENT APPLICATIONS

The following patent applications, which are assigned to the assignee of the present invention and which were filed concurrently on Dec. 17, 1998, cover subject matter related to the subject matter of the present invention: SPEECH COMMAND INPUT RECOGNITION SYSTEM FOR INTERACTIVE COMPUTER DISPLAY WITH INTERPRETATION OF ANCILLARY RELEVANT SPEECH QUERY TERMS INTO COMMANDS, Scott A. Morgan et al., Ser. No. 09/213,856; SPEECH COMMAND INPUT RECOGNITION SYSTEM FOR INTERACTIVE COMPUTER DISPLAY WITH TERM WEIGHTING MEANS USED IN INTERPRETING POTENTIAL COMMANDS FROM RELEVANT SPEECH TERMS, Scott A. Morgan et al., Ser. No. 09/213,845; SPEECH COMMAND INPUT RECOGNITION SYSTEM FOR INTERACTIVE COMPUTER DISPLAY WITH SPEECH CONTROLLED DISPLAY OF RECOGNIZED COMMANDS, Scott A. Morgan, Ser. No. 09/213,846; and SPEECH COMMAND INPUT RECOGNITION SYSTEM FOR INTERACTIVE COMPUTER DISPLAY WITH MEANS FOR CONCURRENT AND MODELESS DISTINGUISHING BETWEEN SPEECH COMMANDS AND SPEECH QUERIES FOR LOCATING COMMANDS, Scott A. Morgan et al., Ser No. 09/213,858.

TECHNICAL FIELD

The present invention relates to interactive computer controlled display systems with speech word recognition and, more particularly, to such systems which receive audible input via non-verbal sound recognition to provide system commands.

BACKGROUND OF RELATED ART

The 1990's decade has been marked by a technological revolution driven by the convergence of the data processing industry with the consumer electronics industry. This advance has been even further accelerated by the extensive consumer and business involvement in the Internet over the past few years. As a result of these changes, it seems as if virtually all aspects of human endeavor in the industrialized world require human/computer interfaces. There is a need to make computer directed activities accessible to people who, up to a few years ago, were computer illiterate or, at best, computer indifferent.

Thus, there is continuing demand for interfaces to computers and networks which improve the ease of use for the interactive user to access functions and data from the computer. With desktop-like interfaces including windows and icons, as well as three-dimensional virtual reality simulating interfaces, the computer industry has been working hard to fulfill such user interaction by making interfaces more user friendly by making the human/computer interfaces closer and closer to real world interfaces, e.g. human/human interfaces. In such an environment, it would be expected that speaking to the computer in natural language would be a very natural way of interfacing with the computer for even novice users. Despite the potential advantages of speech recognition computer interfaces, this technology has been relatively slow in gaining extensive user acceptance.

Speech recognition technology has been available for over twenty years, but it has only recently begun to find commercial acceptance, particularly with speech dictation or "speech to text" systems, such as those marketed by International Business Machines Corporation (IBM) and Dragon Systems. That aspect of the technology is now expected to have accelerated development until it will have a substantial niche in the word processing market. On the other hand, a more universal application of speech recognition input to computers, which is still behind expectations in user acceptance, is in command and control technology; wherein, for example, a user may navigate through a computer system's Graphical User Interface (GUI) by the user speaking the commands which are customarily found in the system's menu text, icons, labels, buttons, etc.

Many of the deficiencies in speech recognition both in word processing and in command technologies are due to inherent speech recognition errors, due in part to the recognition system distinguishing between speech words which are to be converted into strings of displayed text and the above-described verbal commands. The above-mentioned copending patent applications are all directed to implementations for distinguishing speech words from verbal commands. Since the commands are verbal, the processes for distinguishing the commands from verbal speech words is complex.

SUMMARY OF THE PRESENT INVENTION

The present invention is directed towards simplifying command recognition from speech term recognition in speech recognition technology. The invention provides for a system for recognizing non-verbal sound commands within an interactive computer controlled display system with speech word recognition, which comprises standard means for recognizing speech words in combination with means for storing a plurality of non-verbal sounds, each sound representative of a command. There are display means responsive to said means recognizing speech words for displaying said recognized words. In response to the input of non-verbal sounds, there are means for comparing the input non-verbal sounds to said stored sounds together with means responsive to said comparing means for carrying out the command represented by a stored sound which compares to an input non-verbal sound. The non-verbal sounds may be voice generated or they may be otherwise physically generated. The commands may direct movement of data, e.g. cursors displayed on said display system. In such a case, means are provided for inputting a sequential list of the sounds representative of said command directing movement to thereby produce a sequential movement of said displayed data, e.g. cursor movement.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
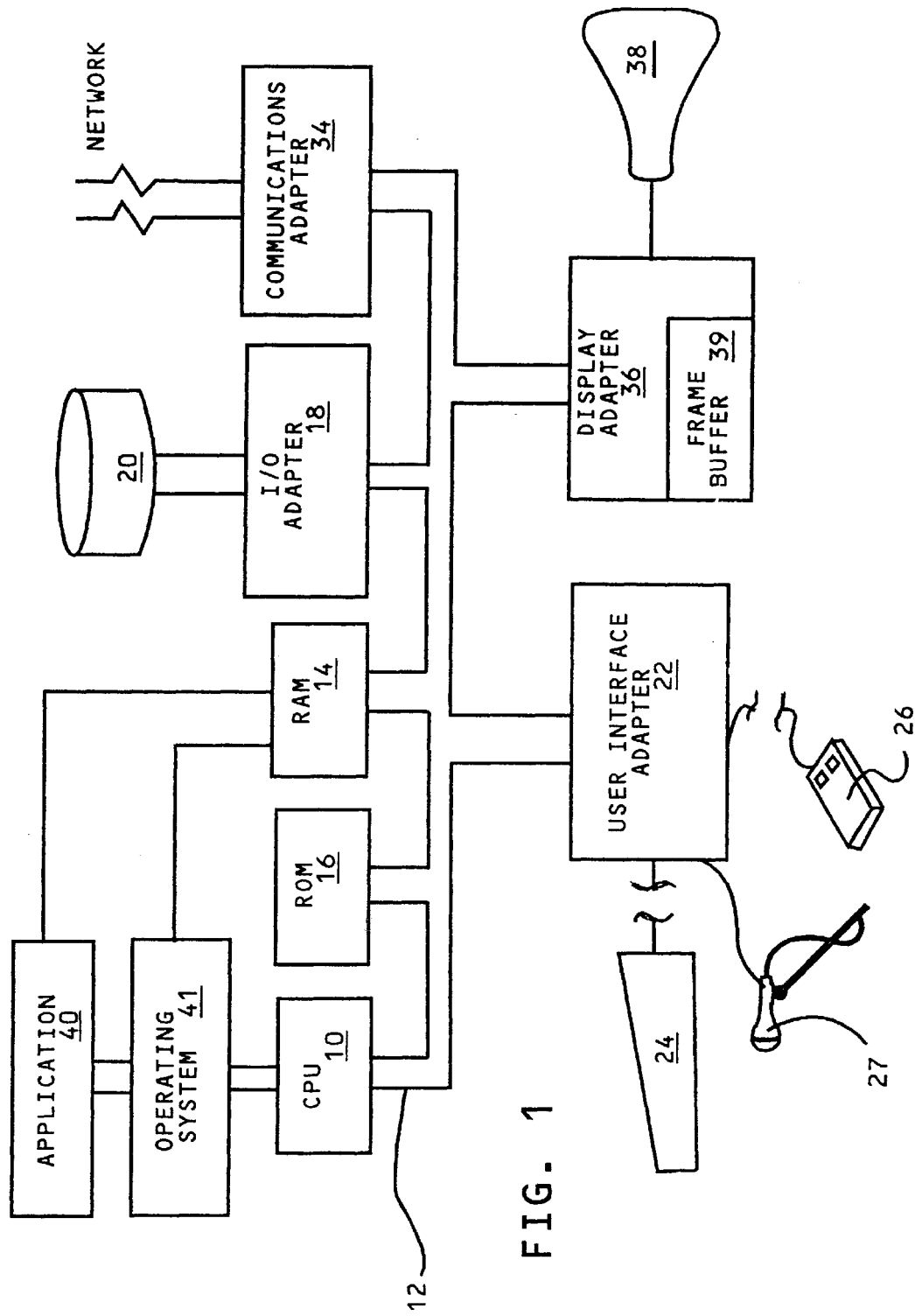
FIG. 1 is a block diagram of a generalized data processing system including a central processing unit which provides the computer controlled interactive display system with voice/sound input used in practicing the present invention.

Referring to FIG. 1, a typical data processing system is shown which may function as the computer controlled display terminal used in implementing the system of the present invention by receiving and interpreting speech and non-verbal sound input and providing a displayed feedback. A central processing unit (CPU) 10, such as any PC microprocessor in a PC available from IBM or Dell Corp., is provided and interconnected to various other components by system bus 12. An operating system 41 runs on CPU 10, provides control and is used to coordinate the function of the various components of FIG. 1. Operating system 41 may be one of the commercially available operating systems such as Microsoft's Windows98™ or WindowsNT™, as well as the UNIX or AIX operating systems. A speech and non-verbal sound recognition program with visual feedback of speech words and proposed commands, application 40, to be subsequently described in detail, runs in conjunction with operating system 41 and provides output calls to the operating system 41, which implements the various functions to be performed by the application 40. A Read Only Memory (ROM) 16 is connected to CPU 10 via bus 12 and includes the Basic Input/Output System (BIOS) that controls the basic computer functions. Random Access Memory (RAM) 14, I/O adapter 18 and communications adapter 34 are also interconnected to system bus 12. It should be noted that software components, including operating system 41 and application 40, are loaded into RAM 14, which is the computer system's main memory. I/O adapter 18 may be a Small Computer System Interface (SCSI) adapter that communicates with the disk storage device 20, i.e. a hard drive. Communications adapter 34 interconnects bus 12 with an outside network enabling the data processing system to communicate with other such systems over a Local Area Network (LAN) or Wide Area Network (WAN), which includes, of course, the Internet. I/O devices are also connected to system bus 12 via user interface adapter 22 and display adapter 36. Keyboard 24 and mouse 26 are all interconnected to bus 12 through user interface adapter 22. The speech and/or non-verbal sound input is made through input device 27, which is diagrammatically depicted as a microphone, which accesses the system through an appropriate interface adapter 22. The speech and non-verbal sound input and recognition will be subsequently described in greater detail, particularly with respect to FIG. 2. Display adapter 36 includes a frame buffer 39, which is a storage device that holds a representation of each pixel on the display screen 38. Images, such as speech input commands, relevant proposed commands, as well as speech input display feedback panels, may be stored in frame buffer 39 for display on monitor 38 through various components, such as a digital to analog converter (not shown) and the like. By using the aforementioned I/O devices, a user is capable of inputting visual information to the system through the keyboard 24 or mouse 26 in addition to speech and sound input through microphone 27. The keyboard 24 and mouse 26 input connections are shown as broken to indicate that while such inputs are optional, the system of the present invention may be effectively used with only the speech/sound input. The system may receive output information from the system via display 38.

Figure 2:
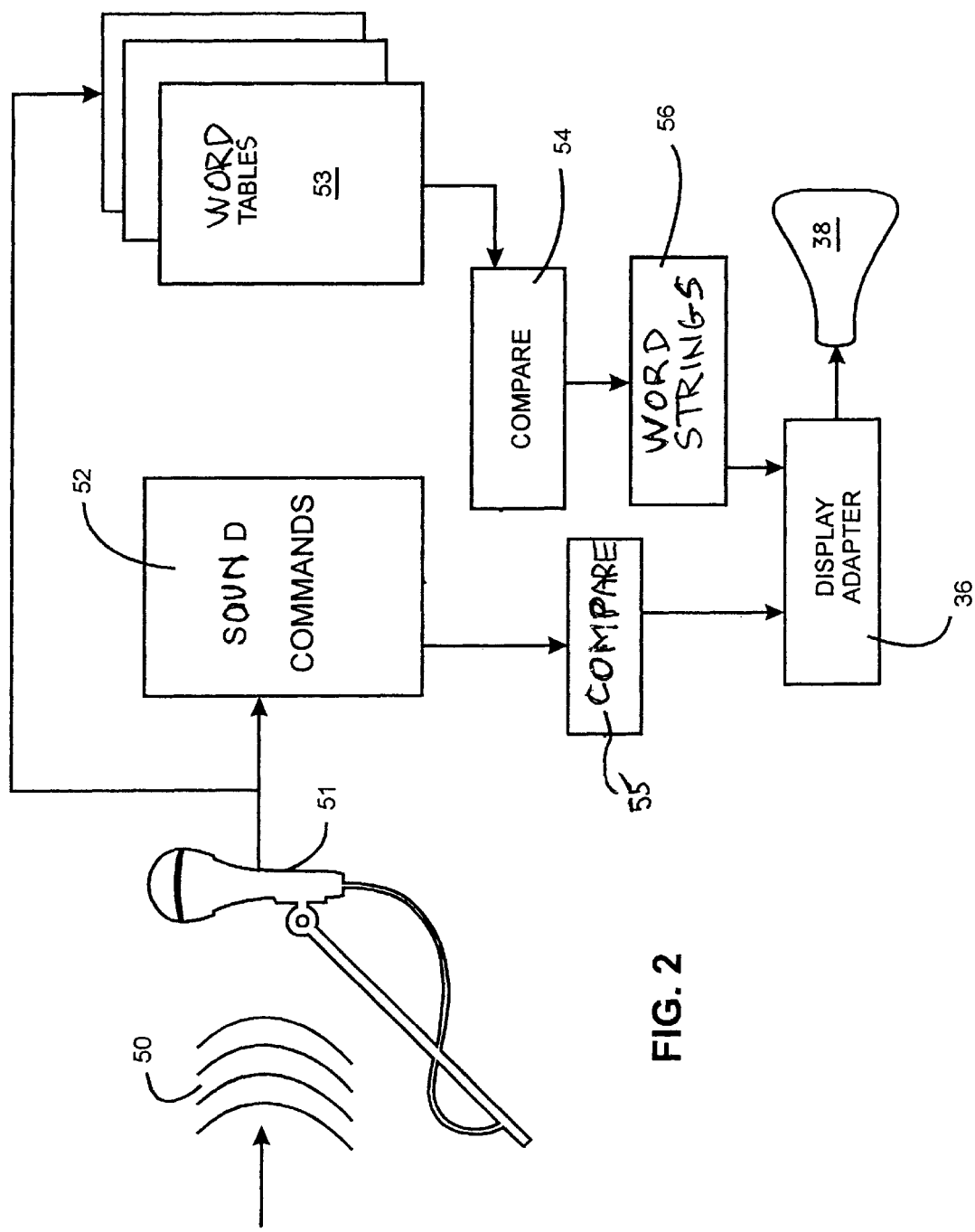
FIG. 2 is a block diagram of a portion of the system of FIG. 1 showing a generalized expanded view of the system components involved in the implementation.

Now, with respect to FIG. 2, we will describe the general system components involved in implementing the invention. Sound and/or speech input 50 is applied through microphone 51 which represents a speech input device. Since the art of speech terminology and speech command recognition is an old and well developed one, we will not go into the hardware and system details of a typical system. Such systems with some programming modifications, which will be subsequently described in detail, may be used to implement the present invention. The apparatus and basic programming of the above-listed copending patent applications may be used in such implementations.

It should be clear to those skilled in the art that the systems and hardware in any of the following patents may be used: U.S. Pat. No. 5,671,328, U.S. Pat. No. 5,133,111, U.S. Pat. No. 5,222,146, U.S. Pat. No. 5,664,061, U.S. Pat. No. 5,553,121 and U.S. Pat. No. 5,157,384. The speech input to the system could be speech words that the system will recognize and/or non-verbal sounds which the user addresses to the computer so that the computer may propose appropriate relevant commands through feedback. The input speech goes through a recognition process which seeks a comparison 54 to a stored set of speech words in word tables 53. The recognized speech words are organized by word stringing means 56 into strings of text which are then sent via display adapter 36 to display 38. In addition, there is stored a basic set of sound commands 52. These sound commands are represented by stored non-verbal sounds. Some examples are vocal: long and short whistles, coughs or hacks, teeth clicks, mouth-tongue clacks and hisses; or manual-physical: knocking on a desk, tapping on a computer case with a metallic object, clapping hands or rubbing sounds. These sounds may be discerned by the above-described voice recognition apparatus based upon digitized sound patterns. Since the sounds are more distinct from each other and from speech words than the standard distinctions between speech words and verbal commands, such sounds are easily recognizable and distinguished by the recognition apparatus and programs. Thus, a comparison 55 is made of an input of non-verbal sound to the stored non-verbal sound commands 52 and recognized non-verbal sounds are input via display adapter 36 to display 38 for verification, as will hereinafter be described.

Figure 3:
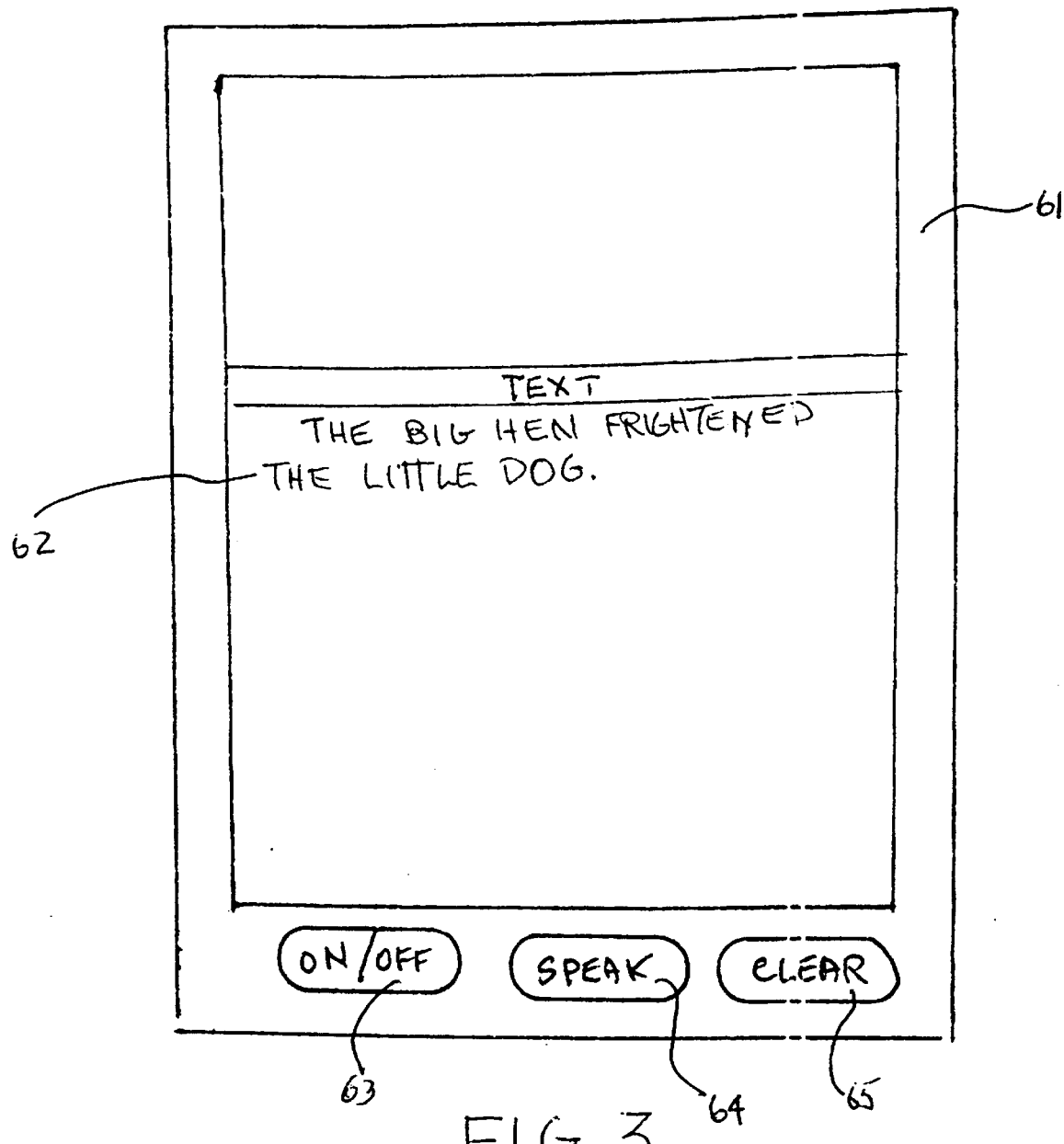
FIG. 3 is a diagrammatic view of a display screen on which an interactive dialog panel interface used for visual display feedback in response to speech word and/or non-verbal sound input (in the case shown, after a speech word input)
Figure 4:
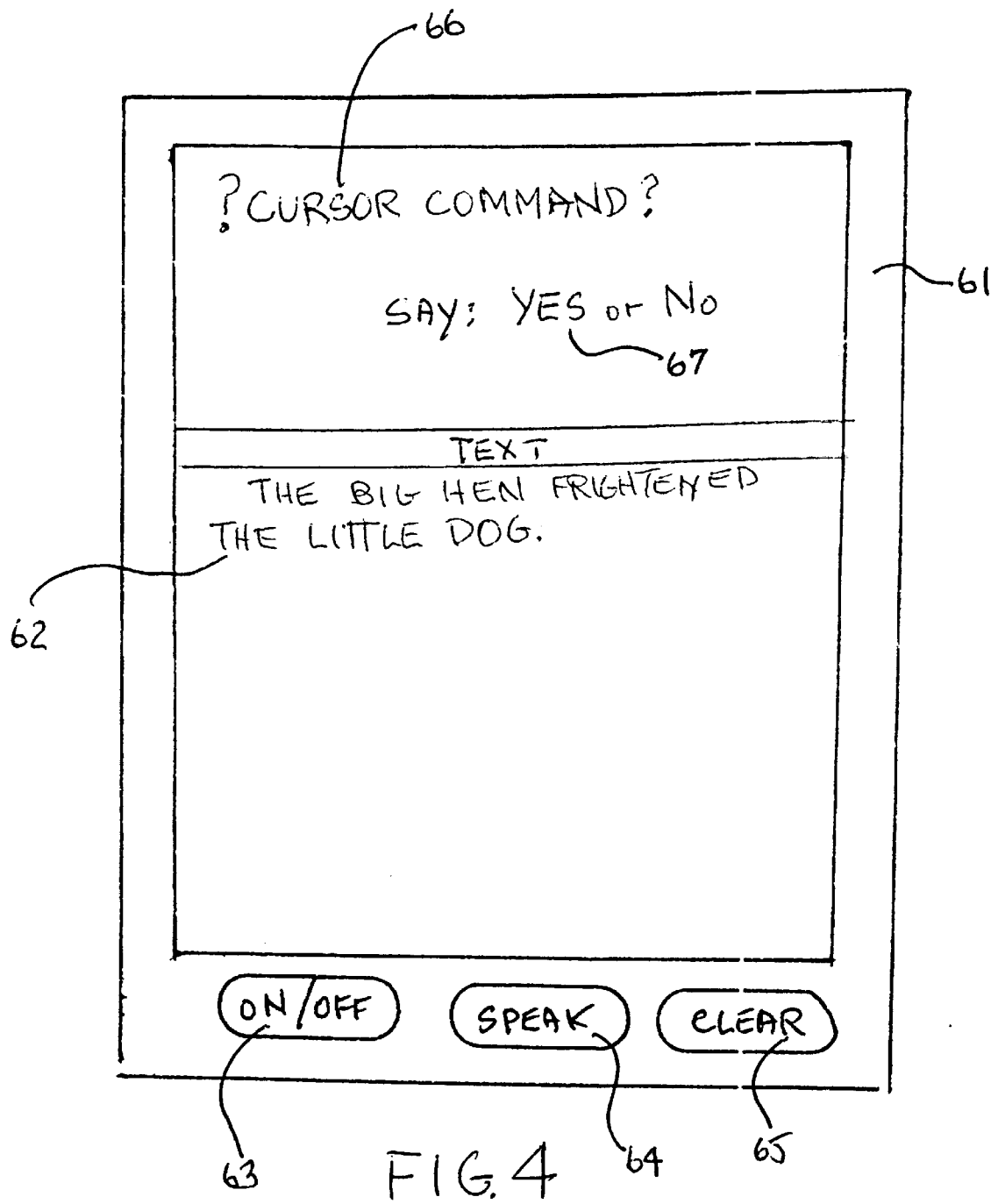
FIG. 4 is the display screen view of FIG. 3 after a non-verbal sound input has been made.
Figure 5:
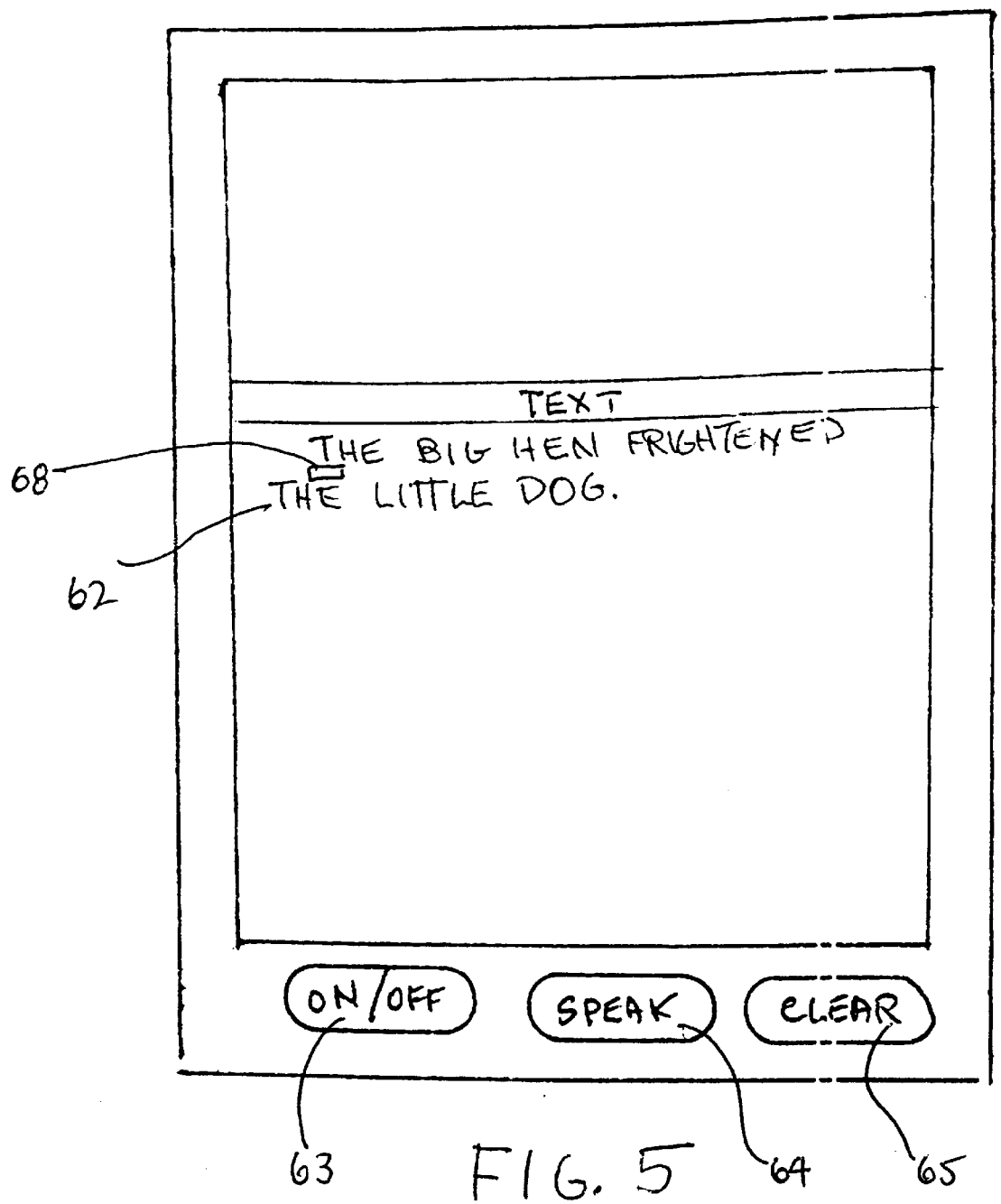
FIG. 5 is the display screen view of FIG. 4 after the user has confirmed that the non-verbal input is a recognized command.

FIGS. 3 through 5 provide an illustrative example of how the present invention may be used to give the visual feedback of non-verbal commands, as well as displaying speech words. When the screen image panels are described, it will be understood that these may be rendered by storing image and text creation programs, such as those in any conventional window operating system, in the RAM 14 of the system of FIG. 1. The display screens of FIGS. 3 through 5 are presented to the viewer on display monitor 38 of FIG. 1. The user may control the screen interactively through the non-verbal commands. The initial display screen of FIG. 3 shows a display screen 61. In the panel, a window will show the recognized speech words that the user speaks arranged in a conventional text string 62. The window has speak 64 and clear 65 buttons, as well as an on/off button 63 to end the speech recognition session. When a non-verbal sound is input, e.g. hand clap=cursor, FIG. 4, the cursor command is displayed, 66, along with a dialog line 67 requesting "Yes or No" confirmation. Then, if the user confirms the cursor command, the cursor 68 appears in an initial position in the text string 62. The cursor 68 may then be moved by commands, e.g. hand clap moves cursor to the right, tongue/mouth clack moves cursor to the left, knocking on desk moves cursor up and metallic tapping moves cursor down. The sound recognition and command execution may be set up so that a sequence of the command sounds (claps, clacks, knocks and taps) accelerate the cursor in the selected direction.

Of course, the commands may relate to functions other than the above-described cursor and cursor movements. Illustrative commands are: "Show Background", "Underline", Hide Menu", "Delete Last Word", "Next Paragraph" or "Close Session".

The very uniqueness of non-verbal sounds is what makes them advantageously distinguishable from speech words. On the other hand, this same uniqueness may present a potential problem in that the display system may have some difficulty in describing the sounds to be used for various commands. For example, while a hand clap or whistle may be easy to define in the command menu presented to the user, a hiss, a hack or mouth-tongue clack may be much harder to describe in words. With such difficult non-verbal sounds, the user may request to hear the sound that he is expected to use. In such a case the system may use standard computer audio output to provide an audio output of the requested non-verbal sound.

The system may also permit the user to tailor the stored non-verbal sound=command relationships to create the user interface that he is most comfortable with. For example, if the user desires to control cursor movements, he may be presented with a default menu:

| TO MOVE CURSOR | |
| --- | --- |
| SOUND | COMMAND |
| Hand Clap | Move to Right |
| Mouth-Tongue Clack | Move to Left |
| Knock | Move Up |
| Metallic Tap | Move Down |

With this default menu, the user may find it difficult to make the mouth-tongue or the metallic tap sounds even after getting the audio output of the sounds as described above. The user may be given the interactive option of changing the default menu to one that he is more comfortable with. For example, he may choose to substitute a teeth click for the tongue-mouth clack and a whistle for the metallic tap.

It is understood that non-verbal sounds and, particularly, voice generated non-verbal sounds may vary significantly from user to user. Thus, the system of this invention may be provided with the heuristic ability of adjusting its stored verbal sounds to accommodate the physical differences in the ability of the particular user to utter or otherwise make the sound. The conventional heuristic implementations of adjusting voice recognition apparatus to the user specifics may be applied for the present purpose.

Figure 6:
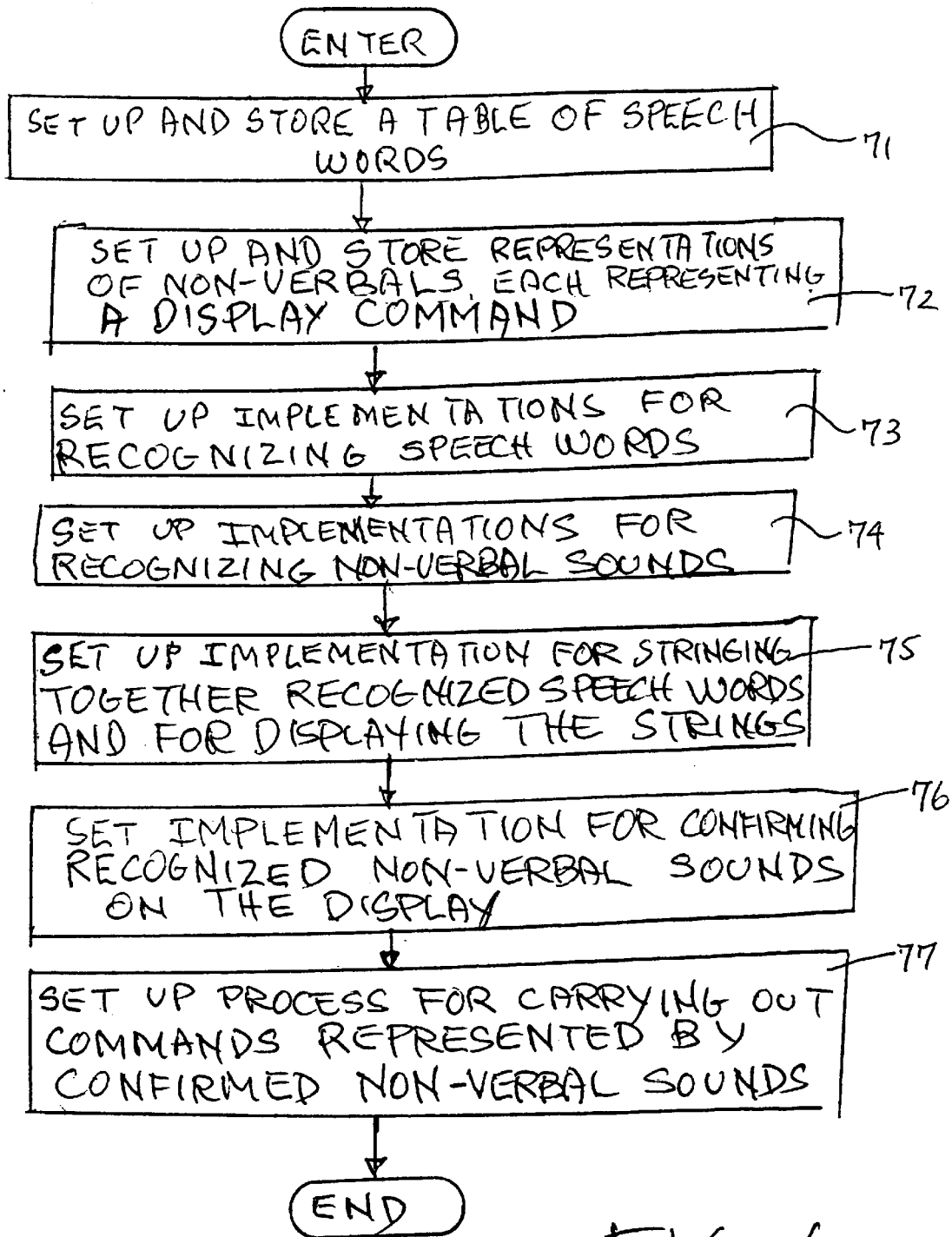
FIG. 6 is a flowchart of the basic elements of the system and program in a computer controlled display system for creating and using the speech word and command recognition.
Figure 7:
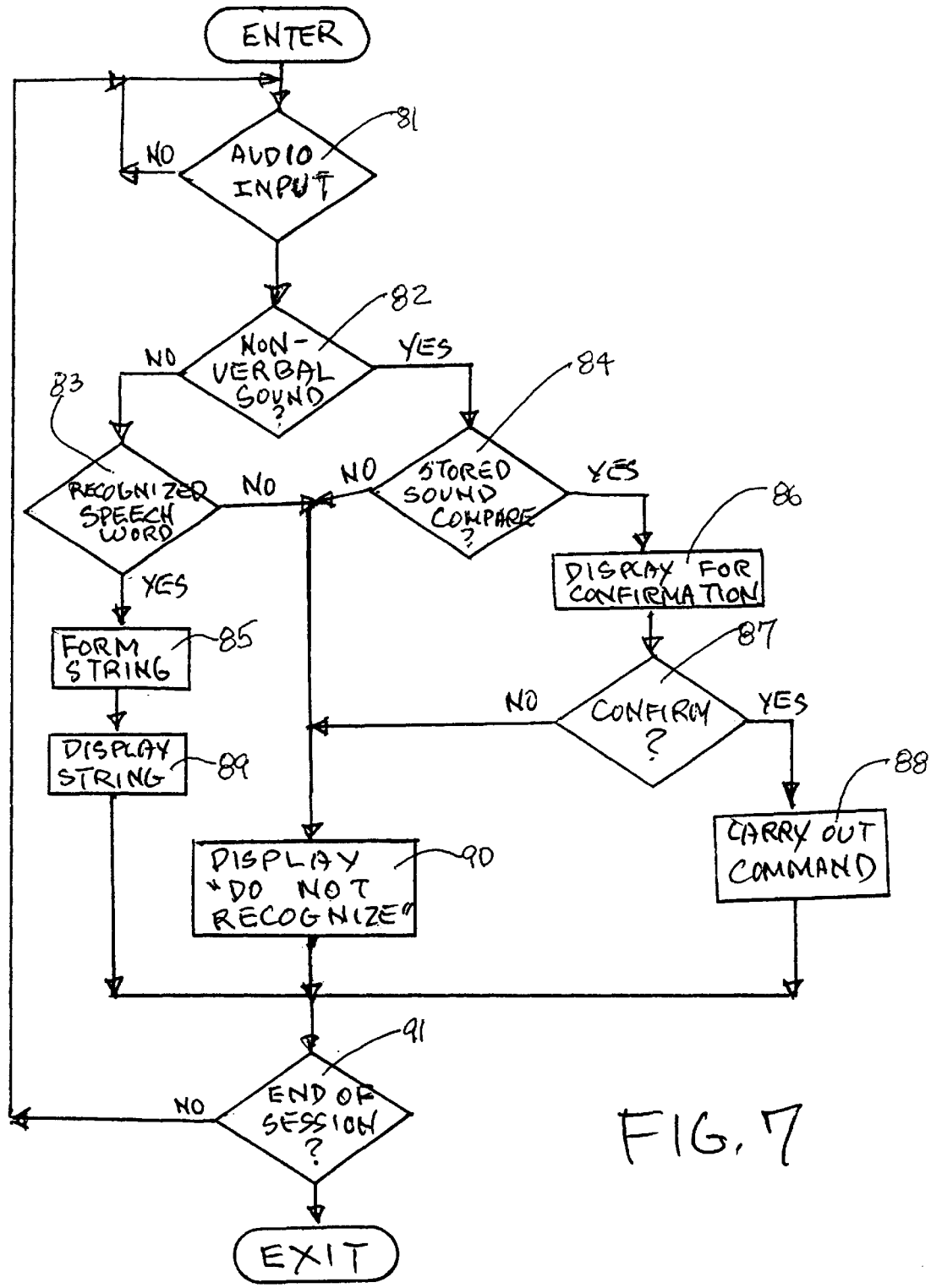
FIG. 7 is a flowchart of the steps involved in running the program set up in FIG. 6.

Now, with reference to FIGS. 6 and 7, we will describe a process implemented by the present invention in conjunction with the flowcharts of these figures. FIG. 6 is a flowchart showing the development of a process according to the present invention for providing non-verbal spoken or other sound commands for controlling the display in a computer controlled display system with speech recognition.

Referring to FIG. 6, standard tables of speech words are set up and stored, step 71. The representations of non-verbal sounds, each representing a display command, are set up and stored, step 72. A standard implementation for speech recognition of speech words is set up and stored, step 73. An implementation for recognition of non-verbal sounds is set up and stored, step 74. An implementation for stringing together recognized speech words and for displaying the strings is set up, step 75. An implementation for confirming recognized non-verbal sound through the display is set up, step 76. A process for carrying out commands represented by confirmed non-verbal sounds is set up, step 77. This completes the set up process.

The running of the process will now be described with respect to FIG. 7. First, step 81, a determination is made as to whether there has been an auditory input. If No, then the input is returned to step 81 where an auditory input is awaited. If the decision from step 81 is Yes, then a further determination is made in decision step 82 as to whether a non-verbal sound has been recognized. If No, a further determination is made as to whether the auditory input is a recognized speech word, step 83. If No, there is displayed to user: "Do Not Recognize", step 90. If Yes, a speech word is recognized in step 83, it is combined with other recognized speech words into a string, step 85, and the string is displayed as text, step 89. If the determination from step 82 is Yes, a non-verbal sound is recognized, then, step 84, that sound is compared with the stored command sounds. If there is No compare, then there is displayed to user: "Do Not Recognize", step 90. If Yes, there is a compare, then, step 86, the command is displayed for confirmation. In the confirmation decision step 87, if there is No confirmation, then, again, there is displayed to user: "Do Not Recognize", step 90. However, if Yes, there is a confirmation, then the command is carried out, step 88. At this point, after each of steps 88, 89 and 90, a determination is conveniently made as to whether the session is at an end, step 91. If Yes, the session is exited. If No, then the process is returned to initial step 81 where the auditory input is awaited.

One of the implementations of the present invention is as an application program 40 made up of programming steps or instructions resident in RAM 14, FIG. 1, during computer operations. Until required by the computer system, the program instructions may be stored in another readable medium, e.g. in disk drive 20 or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In an interactive computer controlled display system with speech word recognition, a system for recognizing non-verbal sound commands comprising:

means for recognizing speech words;

means for storing a plurality of non-verbal sounds, each sound representative of a command directing movement of data displayed on said display system;

means responsive to said means recognizing speech words for displaying said recognized words;

means for receiving non-verbal sound;

means responsive to said received non-verbal sounds, for comparing said received non-verbal sounds to said stored sounds;

means responsive to said comparing means for carrying out the command represented by a stored sound which compares to a received non-verbal sound; and means for inputting a sequence of the non-verbal sounds representative of said commands directing movement to thereby produce a sequential movement of said displayed data.

2. The system of claim 1 wherein said non-verbal sounds are voice generated.

3. The system of claim 1 wherein said non-verbal sounds are physically generated.

4. The system of claim 1 wherein said sequentially moved displayed data is a cursor.

5. In an interactive computer controlled display system with speech word recognition, a method for recognizing non-verbal sound commands comprising the steps of:

recognizing speech words;

receiving non-verbal sounds;

storing a plurality of non-verbal sounds, each sound representative of a command directing movement of data displayed on said display system;

displaying recognized speech words in response to the recognizing of said speech words;

responsive to received non-verbal sounds, comparing said received non-verbal sounds to said stored sounds;

responsive to a compare of said received non-verbal sound to a stored sound, carrying out the command represented by said stored sound; and inputting a sequence of the non-verbal sounds representative of said commands directing movement to thereby produce a sequential movement of said displayed data.

6. The method of claim 5 wherein said non-verbal sounds are voice generated.

7. The method of claim 5 wherein said non-verbal sounds are physically generated.

8. The method of claim 5 wherein said sequentially moved displayed data is a cursor.

9. A computer program having program code included on a computer readable medium for recognizing non-verbal sound commands in an interactive computer controlled display system with speech word recognition comprising:

means for recognizing speech words;

means for storing a plurality of non-verbal sounds, each sound representative of a command directing movement of data displayed on said display system;

means responsive to said means recognizing speech words for displaying said recognized words;

means for receiving non-verbal sounds;

means responsive to said received non-verbal sounds, for comparing said received non-verbal sounds to said stored sounds;

means responsive to said comparing means for carrying out the command represented by a stored sound which compares to a received non-verbal sound; and means &r inputting a sequence of the non-verbal sounds representative of said commands directing movement to thereby produce a sequential movement of said displayed data.

10. The computer program of claim 9 wherein said non-verbal sounds are voice generated.

11. The computer program of claim 9 wherein said non-verbal sounds are physically generated.

12. The computer program of claim 9 wherein said sequentially moved displayed data is a cursor.

* * * * *

UNITED STATES PATENT AND TRADEMARK OFFICE
CERTIFICATE OF CORRECTION

PATENT NO. : 6,820,056 B1
DATED : November 16, 2004
INVENTOR(S) : Harif

It is certified that error appears in the above-identified patent and that said Letters Patent is hereby corrected as shown below:

Column 8,
Line 29, please delete "&r" and replace it with -- for --.

Signed and Sealed this

Seventh Day of June, 2005

JON W. DUDAS
*Director of the United States Patent and Trademark Office*